(12) United States Patent
Yoshino et al.

(10) Patent No.: US 7,092,621 B1
(45) Date of Patent: Aug. 15, 2006

(54) DATA RECORDER-REPRODUCER AND BIT MAP DATA PROCESSING METHOD, CONTROL PROGRAM PROCESSING METHOD AND SETTING DATA PROCESSING METHOD OF DATA RECORDER-REPRODUCER

(75) Inventors: Shigeru Yoshino, Kanagawa (JP); Hiroshi Masuda, Kanagawa (JP); Yoshiharu Yamashita, Kanagawa (JP); Ichiro Fujisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/436,870

(22) Filed: Nov. 9, 1999

(30) Foreign Application Priority Data

Nov. 10, 1998 (JP) ................................ 10-336580

(51) Int. Cl.
*H04N 5/781* (2006.01)
(52) U.S. Cl. ...................................... 386/125; 711/114
(58) Field of Classification Search .................... 386/1, 386/45, 46, 95–96, 125–126, 52; 369/30.4, 369/700; 345/661; 348/231.4, 563, 584, 348/725; 714/6, 20, 114, 766, 5–7, 10, 52; 711/112, 114, 170, 173
See application file for complete search history.

(56) References Cited

U.S. PATENT DOCUMENTS

| | | | | | |
|---|---|---|---|---|---|
| 5,564,073 | A | * | 10/1996 | Takahisa | 348/473 |
| 5,826,075 | A | * | 10/1998 | Bealkowski et al. | 714/6 |
| 6,011,546 | A | * | 1/2000 | Bertram | 345/700 |
| 6,014,170 | A | * | 1/2000 | Pont et al. | 386/98 |
| 6,052,508 | A | * | 4/2000 | Mincy et al. | 386/96 |
| 6,233,654 | B1 | * | 5/2001 | Aoki et al. | 369/30.4 |
| 6,324,334 | B1 | * | 11/2001 | Morioka et al. | 386/52 |
| 6,396,507 | B1 | * | 5/2002 | Kaizuka et al. | 345/661 |

* cited by examiner

*Primary Examiner*—James J. Groody
*Assistant Examiner*—Christopher Onuaku
(74) *Attorney, Agent, or Firm*—Frommer Lawrence & Haug LLP; William S. Frommer; Thomas F. Presson

(57) ABSTRACT

In a data recorder-reproducer, and a bit map data processing method, a control program processing method and a setting data processing method of the data recorder-reproducer, bit map data supplied from the external is taken in, and the taken bit map data is superimposed upon data which is reproduced from a recording medium or is input from the external. In addition, first program data stored in a rewritable storing means is rewritten into second control program data supplied from the external. Furthermore, settings of an input/output means is changed based on the setting data supplied from the external.

2 Claims, 3 Drawing Sheets

DATA RECORDER-REPRODUCER AND BIT MAP DATA PROCESSING METHOD, CONTROL PROGRAM PROCESSING METHOD AND SETTING DATA PROCESSING METHOD OF DATA RECORDER-REPRODUCER

BACKGROUND OF THE INVENTION

1. Field of the Inevntion

This invention relates to a data recorder-reproducer, a bit map data processing method, control program processing method and setting data processing method of the data recorder-reproducer, and more particularly, is suitably applied to a video server.

2. Description of the Related Art

In a video server, a so-called redundant array of inexpensive disc (RAID) in which hard disk drives (HDDs) each composed of plural hard disk (HDs) which can be accessed at random are arranged in parallel is employed. This is because data to be recorded includes video data and its volume became large and further, it is necessary to secure redundancy to get more reliability of data including video data used for broadcasting.

In addition, the video server has plural input/output processing processors to access this recording medium, processes data including video data and audio data transmitted from the external, performs compressing processing on them if necessity, and transmits the processed data to the RAID. In addition, the video server processes data reproduced from the RAID and outputs them to the external as transmission data. To each input/output processing processor, a time slot is allotted (a time slot signal is supplied) so as to access the RAID, and each input/output processing processor accesses the RAID within this time slot duration. This time slot duration has very short time, so it is seemed that the recording/reproducing to/from the RAID for multiple channels is performed at the same time.

By the way, the conventional video server does not have a signal processing function of superimposing bit map data (text data such as a telop and a title or video data such as graphics) upon video signals, and such signal processing is performed using a special apparatus (mixer).

Therefore, a mixer is required even in the case where a simple text or a simple image is to be superimposed upon the image that is outputted from the video server; for instance, in the case where relay broadcasting is to be performed, it is required to convey a mixer along with a video server every time, or it is required to perform such signal processing at the broadcasting station side.

Besides, the conventional video server has software for various functions such as recording and reproducing, however, the only way for version-up of software is that the corresponding substrate is taken out and then the read only memory (ROM) storing the program therein, which is mounted on the substrate, is replaced.

Therefore, in such a video server, there have been such fears that a ROM might be mounted inversely in replacement, or a wrong slot of the substrate might be used, or an unsatisfactory electrical contact might be generated. And, in the occasion like this, there has been a fear that the circuit might be broken at the worst.

Besides, in general, in the great majority of audio/video (AV) devices, various settings are to be performed by inputting set values from their menus. Therefore, in such an AV device, at the time of replacement of the apparatus or in the case where the same setting is to be made as that of the current device, various settings must be achieved with the same method for each setting with respect to the new apparatus, which cause complicated setting works.

Therefore, it is considered that if a video server itself can superimpose bit map data upon video data that is inputted from the external or that has been stored therein, functional ability can be improved without carrying a mixer for relay broadcasting and so on.

Besides, it is considered that if it is possible, in a video server, to update software without replacing a ROM for instance, the version-up of software can be easily performed with preventing any accident that might occur during the replacement of ROM. In addition, it is considered that if it is possible to change the settings without the input work for each set value for instance, the usability can be improved because the complicated setting works can be avoided.

SUMMARY OF THE INVENTION

In view of the foregoing, an object of this invention is to provide a data recorder-reproducer and a bit map data processing method thereof which can improve functional ability firstly, a data recorder-reproducer and a control program processing method thereof which can perform the version-up of software at ease secondly, and a data recording/reproducing and a setting data processing method thereof which can improve usability thirdly.

The foregoing object and other objects of the invention have been achieved by the provision of a data recorder-reproducer which comprises a superimposing processing means for superimposing bit map data taken in by a taking-in means upon data which is output or input to/from a recording medium. As a result, this data recorder-reproducer itself can superimpose bit map data upon video data without using other external devices.

Further, in the present invention, the data recorder-reproducer comprises a rewritable storing means for storing first control program data which is used for processing of plural input/output processing means, a taking-in means for taking in second control program data which is input from the external and is used for processing of the plural input/output processing means, and a rewriting means for rewriting the first control program data stored in the storing means to second control program data taken in by the taking-in means. As a result, this data recorder-reproducer can change control programs easily.

In addition, the present invention provides a data recorder-reproducer which comprises a taking-in means for taking in setting data that is inputted from the external and is previously supplied in processing of plural input/output processing means, and a setting changing means for changing the setting corresponding to the input/output processing means on the basis of the setting data taken in by the taking-in means. As a result, the data recorder-reproducer can change various settings easily.

Further, the present invention provides a bit map data processing method of a data recorder-reproducer which comprises a first step of taking in bit map data which is input from the external, and a second step of superimposing the bit map data taken in by the first step on data output from a recording medium or on data input to an input/output processing means and outputting them. As a result, this bit map data processing method of the data recorder-reproducer makes it possible to superimpose bit map data on video data by only the data recorder-reproducer without using other external devices.

Further, the present invention provides a control program data processing method of a data recorder-reproducer which comprises a first step of storing first control program data which is used for processing of plural input/output processing means in a rewritable storing means, a second step of taking in second control program data which is input from the external and is used for processing of the plural input/output processing means, and a third step of rewriting the first control program data stored in the storing means to the second control program data taken in by the first step. As a result, this control program data processing method of the data recorder-reproducer makes it possible to easily change control programs by the data recorder-reproducer.

Further, the present invention provides a setting data processing method of a data recorder-reproducer which comprises a first step of taking in setting data which is supplied from the external and is previously supplied in processing of plural input/output processing means, and a second step of changing settings corresponding to the input/output processing means based on the setting data taken in by the first step. As a result, this setting data processing method of the data recorder-reproducer makes it possible to change various settings easily.

The nature, principle and utility of the invention will become more apparent form the following detailed description when read in conjunction with the accompanying drawings in which like parts are designated by like reference numerals or characters.

Figure 1:
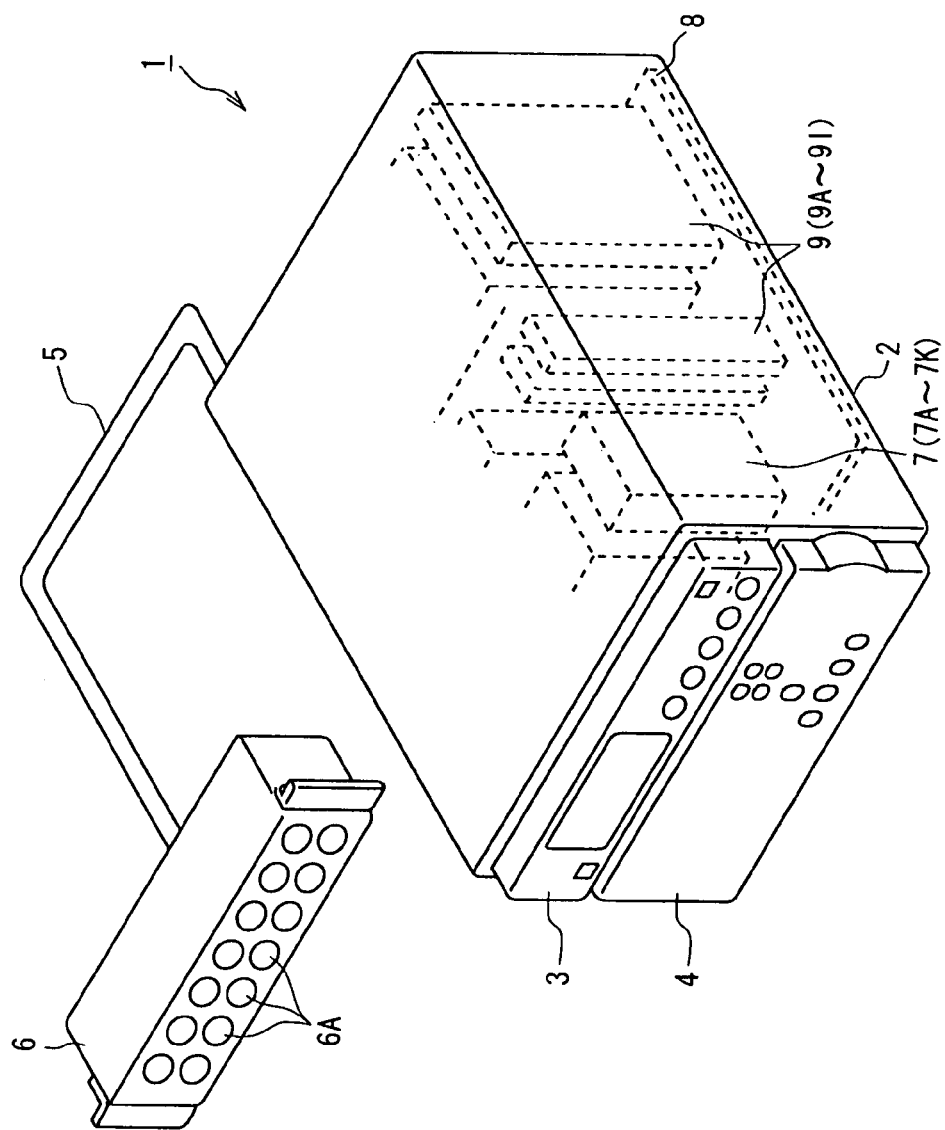
FIG. 1 is a schematic perspective view illustrating an appearance of a video server according to an embodiment of the present invention.

DETAILED DESCRIPTION OF THE EMBODIMENT (1) Configuration of Video Server of the Present Embodiment FIG. 1 generally shows the appearance of a video server 1 according to the present invention. In this video server 1, a meter panel 3 and a control panel 4 are placed on the front of an enclosure 2, and a connector box 6 that has been provided with plural input/output terminals 6A is connected to the rear of the enclosure 2 through a connecting cable 5.

Besides, the enclosure 2 includes plural HHDs 7 that constitute a disk array, and plural substrates 9 for various signal processing and for controlling that have been mounted on a mother board 8 such that they can be freely inserted and taken out.

Figure 2:
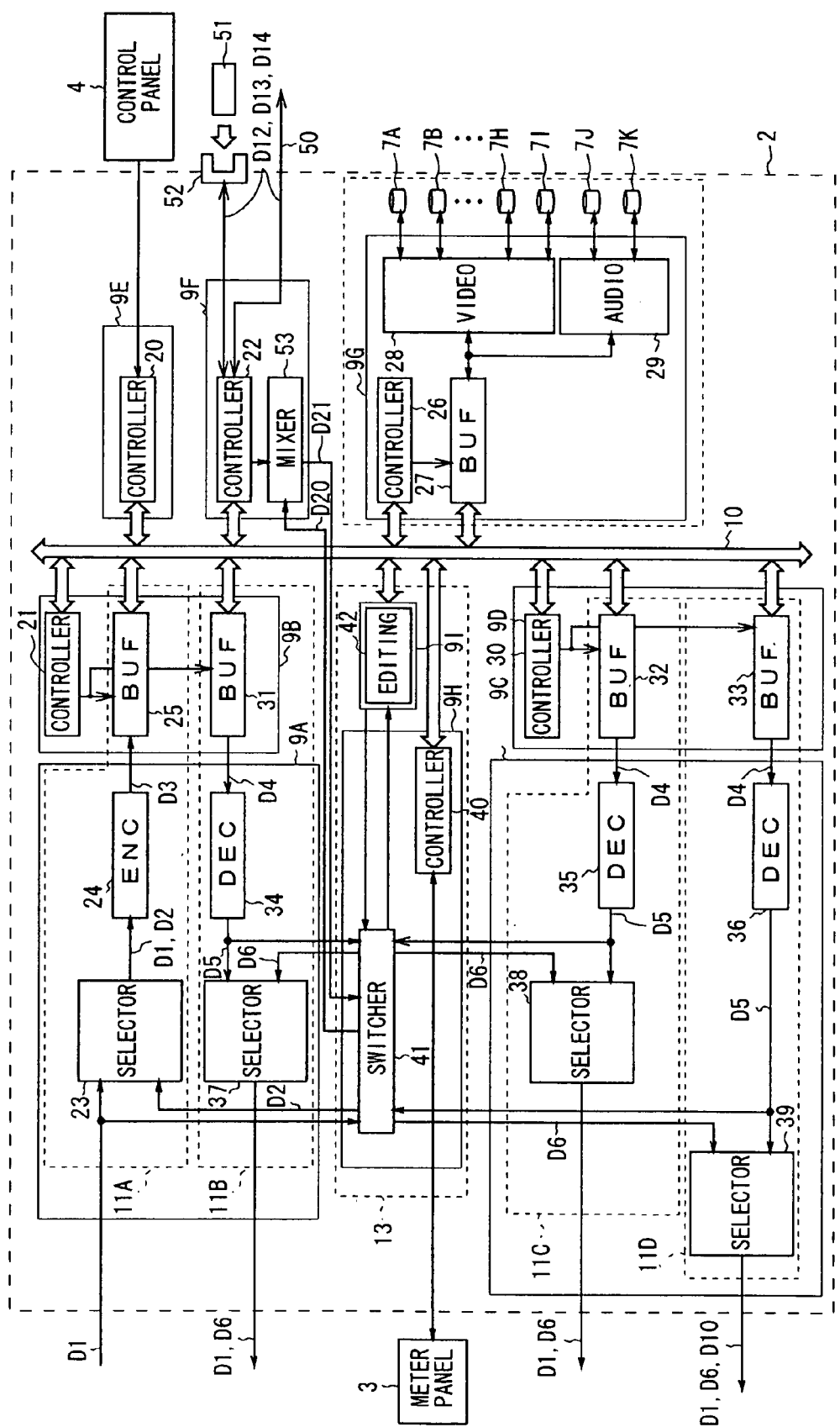
FIG. 2 is a block diagram showing an internal configuration of the video server according to this embodiment.

In this case, these substrates 9 are connected as shown in FIG. 2 with a bus 10 (FIG. 2) and wirings that have been placed on the mother board 8; an input processor 11A for a recording channel and a first output processor 11B for a reproducing channel are formed by an input/output substrate 9A and a first connecting substrate 9B; a second and a third output processors 11C and 11D for a reproducing channel are formed by an output substrate 9C and a second connecting substrate 9D.

And, in this video server 1, desired processing can be executed in response to various commands input by manipulating the control panel 4.

FIG. 2 shows the whole configuration of the video server 1.

The video server 1 is mainly composed of the input processor 11A, the plural output processors 11B to 11D, a RAID 12, plural controllers 20, 22, an editing section 13, and the bus 10 for connecting between them, as a whole.

The input processor 11A performs data processing so as to record data input from the external in each of the HDs consisting the RAID 12. The first to third output processors 11B to 11D process data reproduced from the HDs to transmit them to the external.

Time slot signals are sequentially supplied from the controller 20 to the input processor 11A and the first to third output processors 11B to 11D, which allows these processors access the RAID 12 within the time slot duration shown by the supplied signals. That is, the input processor 11A and the output processors 11B to 11D each outputs/inputs processed data to/from the RAID 12 within the allotted time slot duration.

In this way, the input processor 11A and the first to third output processors 11B to 11D control the bus 10 by time sharing so as to use the bus 10, and input/output processing for three channels is performed at the same time considering each of the input processor 11A and the output processors 11B to 11D as one channel. Therefore, in the example shown in FIG. 2, inputting for one channel and outputting for three channels can be performed at the same time.

The input processor 11A is mainly composed of a selector 23, an encoder 24, and a buffer 25.

The selector 23 selects and outputs either data D1 including video data and/or audio data input from the external or data D2 including video data and/or audio data output from a switcher 41 described later.

The data D1, D2 output from the selector 23 are input to the encoder 24 and are converted into data to be recorded in the HD. For example, when the data including video and audio data is input, it is divided into video data and audio data and further, these data can be subjected to compression processing like MPEG if required.

The data D3 output from the encoder 24 is stored in the buffer memory 25 once. This is because only the duration of allotted time slot allows the use of the bus 10, so that the data D3 is stored in the memory 25 until the duration of the time slot comes.

When the time slot signal is supplied from the controller 20 to a controller 21, the data D3 being stored in the buffer memory 31 is output to the RAID 12 through the bus 10 under the control of the controller 21. At this time, the data D3 is transferred to the RAID 12 including control data to instruct writing.

The output processors 11B to 11D have the same configuration, so that the output processor 11B will be explained below.

The output processor 11B is composed of a buffer memory 31, a decoder 34, and a selector 37.

The buffer memory 31 stores data D4 transferred through the bus 10 therein once. That is, under the time sharing control described above, data D4 is stored once because required data, for example, video data for plural frames may not obtained within the time slot duration, and then when the required data D4 is obtained, the data D4 is output from the buffer 31.

The decoder 34 receives the data D4 output from the buffer 31 and executes the reverse of processing executed by the encoder 24 described above. That is, expansion processing is performed in the case where the data D4 is compressed data so that the data can be converted into data which can be output to the external.

The selector 37 selects and outputs either the data D5 output from the decoder 34 or the data D6 from the switcher 41 described later.

The RAID 12 is mainly composed of a data processor 9G, and HHDs 7A to 7K. As shown in FIG. 2, the HDDs 7A to 7I store video data and the HDDs 7J, 7K store audio data. Here, the HDDs 7A to 7I each has the RAID-3 structure, and the HDD 7I stores parity data and the other HDDs 7A to 7H store video data so as to improve redundancy. In addition, the HDDs 7J and 7K each has a so-called RAID-1 structure and also a mirror structure in which the same audio data is stored in both the HDDs 7J and 7K.

The data processor 9G is composed of a controller 26, a buffer 27, a video data divider/multiplexer 28, and an audio data divider/multiplexer 29.

The controller 26 is supplied with control data transferred from the input processor 11A described above, and controls recording of data supplied from the input processor 11A and reproducing of data from the HDDs 7A to 7K based on the control data.

The buffer 27 is used to store data transferred through the bus 10 once and to store data to be transferred to the bus 10 once.

The video data divider/multiplexer 28 divides video data output from the buffer 27 to record them in the HDDs 7A to 7H, and moreover, calculates parity data of the divided video data. The divided video data is recorded in the HDDs 7A to 7H and the obtained parity data is recorded in the HDD 7I. The audio data is divided by the divider/multiplexer 29 so that the same data is recorded in both the HDDs 7J and 7K, and is outputted to the HDDs 7J, 7K.

In reproducing, control data to instruct reproduction is transferred from the controllers 21 and 30 of the first to third output processors 11B to 1D, and each HDD 7A–7K is controlled based on the control data to reproduce video data and audio data. The video data reproduced from the HDDs 7A to 7I are multiplexed by the video data divider/multiplexer 28 and the resultant is output to the buffer 27. The audio data is output from the HDDs 7J 7K, but normally, reproduction data from either one is output.

In the case where one HDD 7A–7K can not be used because of trouble or exchanging, with respect to video data, parity data from the HDD 7I and video data from the other HDDs 7A–7H are subjected to interpolation processing by the divider/multiplexer 28 and the resultant is output. Further, as for the audio data, data having the same contents has been stored in both the HDDs 7J, 7K, so that even when one HDD is into trouble or is exchanged, audio data reproduced from the other HDD 7J, 7K is output.

The operation of the video server 1 performed by manipulating the control panel 4 will be described below. The video server 1, receiving a recording command by manipulating the control panel 4, supplies the corresponding command to the controller 21 from the controller 20 through the bus 10.

At this time, the controller 21 accesses the controller 22 through the bus 10 based on the supplied command. The controller 22 stores information which is called a file system and is to control the addresses of data recorded in the HDDs 7A to 7K. The file system includes information on which address (the head address) is the first one to record a file and how long (the length of recording) the file is recorded and information on the head address of an area having no data and its length.

By referring to this file system, it can be understood in detail an area where a file has been recorded, or where a file should be recorded.

The input/output controller 21, knowing the addresses of the co secured recording area from the controller 22 as this result, controls the input processor 11A to make the encoder 24 take in the data D1 including video and/or audio data supplied through the corresponding input/output terminal 6A of the connector box 6 from the external via the selector 23.

Further, the controller 21 performs encoding such as the MPEG compression on the data D1 with the encoder 24 as described above, and stores the obtained data D3 in the buffer memory 25.

Then, the controller 21 reads out the data D3 written in the buffer memory 25 at a prescribed timing, and transmits this to the controller 26 through the bus 10 together with a writing request command generated based on the aforementioned specified recording area address.

At this time, the controller 26 sequentially takes the supplied data D3 in the buffer memory 27 based on the writing request command. Then, the controller 26 sequentially reads out the taken data D3, and transmits the video data to the video divider/multiplexer 28 and also transmits the audio data to the audio divider/multiplexer 29.

The video divider/multiplexer 28 sequentially divides the supplied video data according to a prescribed unit (for example, one byte), and sequentially allots and supplies the obtained video data of the prescribed unit (hereinafter, referred to as divided video data) to the HDDs 7A to 7H. These divided video data are sequentially recorded in the addresses of the HDs in the HDDs 7A to 7H specified by the controller 22.

Further, at this time, the video divider/multiplexer 28 sequentially generates the parity data based on the video data as described above, and supplies these to the HDD 7I. Thereby, the parity data are sequentially recorded in the addresses of the HD in the HDD 7I specified by the controller 22.

Further, the audio divider/multiplexer 29 sequentially gives the supplied audio data to the HDDs 7J, 7K. Thereby, the audio data are sequentially recorded in the addresses of the HD in each HDD 7J, 7K specified by the controller 22.

In this way, the video server 1 compresses and encodes video and/or audio data included in the data D1 supplied from the external as required, and stores the resultant in the RAID 12.

On the other hand, the controller 20, receiving a reproduction request of any reproduction channel by manipulating the control panel 4, transmits the command corresponding to the request through the bus 10 to the controller 21 or the controller 30 for the specified reproduction channel.

At this time, the controller 21 or the controller 30 accesses the controller 22 through the bus 10 based on the supplied command in order to seek the recording area in the HD of each HDD 7A to 7K in which the specified video and/or audio data are recorded.

Then, the controller 21 or the controller 30, knowing the addresses of the recording area from the controller 22 as this result, transmits the request command to read out the video and/or audio data based on these addresses to the controller 26 of the RAID 12 through the bus 10.

At this time, the controller 26 controls the HDDs 7A to 7I based on the reading request command to read out the corresponding divided video data and parity data at once, and transmits these to the video divider/multiplexer 28.

Then, the video divider/multiplexer 28 sequentially restores original video data from the supplied divided video data, by integrating the video data and the parity data if required, and then stores this in the buffer memory 27.

Further, the controller 26 controls the HDDs 7J, 7K based on the reading request command to read out the corresponding audio data at once, and transmits this to the audio divider/multiplexer 29.

Then, the audio divider/multiplexer 29 restores original data by integrating the supplied audio data and sequentially stores this in the buffer memory 27.

The restored video data and audio data stored in the buffer memory 27 are read out under the control of the controller 21 or the controller 30 by the aforementioned time sharing control, and are stored in the buffer memory 31–33 of the first–third output processor 11B–11D corresponding to the specified reproduction channel through the bus 10. At this time, data to instruct the reproduction is transmitted through the bus 10 in the time sharing, so that the mediation of the bus is by sequentially outputting reproduction data based on the control data.

Further, the controller 21 or the controller 30 sequentially reads out the video data and audio data stored in the buffer memories 31 to 33, supplies these as data D4 to the corresponding decoders 34 to 36. The decoders 34 to 36 decode these data and outputs the obtained data D1 of the original signal form to the external through the corresponding selectors 37 to 39, the corresponding input/output terminals 6A of the connector box 6 in order.

In this way, the video server 1 outputs specified video and/or audio data out of the video and/or audio data stored in the HDDs 7A to 7K from the specified reproduction channel.

On the other hand, when received the editing request such as editing processing of cut-in, cut-out, and so on, and special effect processing for the cut-in or cut-out video and audio with respect to the video and/or audio data stored in the HDDs 7A to 7K and the video and/or audio data included in the data D1 supplied from the external by manipulating the control panel 4, the controller 20 transmits the corresponding command to the controller 21 or the controller 30, and the controller 40 of the editing part 13 through the bus 10.

As a result, similarly to the aforementioned reproduction operation, the corresponding video and audio data are read out from the HDDs 7A to 7K and decoded by the corresponding first to third output processors 11B to 1D, and the obtained data D5 are supplied to the switcher 41.

Further, at this time, the controller 40 switching-controls the switcher 41 based on the supplied command to perform the aforementioned cut-in, -out editing processing on the video and/or audio data to be edited.

That is, the switcher 41 is always given video and/or audio data as the data D1 or data D5 from the input processor 11A and the first to third output processors 11B to 11D. The switcher 41 is switched under the control of the controller 40 to switch its inputs at predetermined timing, and outputs the data to any one of output to perform the editing processing.

At this time, if the control is made so as to perform the special effect processing on the data, the video and/or audio data is output to the special effect part 42. Otherwise, if the control is made so as not to perform the special effect processing, the video and/or audio data is output to any one of the input processor 11A and the first to the third output processors 11B to 11D.

Further, when the video and/or audio data which has been subjected to the editing processing or the special effect processing are stored in the RAID. 12, the switcher 41 outputs the data as data D2 to the input processor 11A under control. Then, the data D2 is input to the encoder 24 by switching the selector 23 of the input processor 11A to be stored in the RAID 12.

When the video and/or audio data which has been subjected to the editing processing or the special effect processing is immediately output, the switcher 41 is controlled so as to output the data as the data D6 to any one of the first to third output processors 11B to 11D, and the data D6 is output from the output processor 11B–11D through the selector 37–39.

In this way, the video server 1 performs the specified editing processing, and outputs the obtained edited video and/or audio data to the external or stores them in the RAID 12.

In addition to the above configuration, the video server 1 is to give the bit map data D12 that is comprised of text data, such as a telop and a title, and image data, such as graphics, and that has been made using a personal computer to the controller 22 via the Ethernet 50.

Besides, a card slot 52 for a memory card 51 is arranged on the stated position of the enclosure 2, therefore, it is able to give the bit map data D12 recorded in the memory card 51 to the file management controller 22 through the card slot 52.

Further, this video serer 1 is provided with the mixer 53 comprised of a mixing circuit for video, and can perform the signal processing of superimposing the bit map data D12 supplied to the controller 22 upon the video and/or audio data included in the data D1 input from the external or the video and/or audio data stored in the HDDs 7A to 7K if required.

Then, when the controller 22 receives the signal processing request to superimpose the bit map data D12 upon the video and/or audio data included in the input data D1 or the video and/or audio data stored in the HDDs 7A to 7K by manipulating the control panel 4, it transmits the command corresponding to this request to the controller 20, 31 of the corresponding input processor 11A or first–third output processor 11B–11D, the controller 40 of the editing part 13, the controller 22 through the bus 10.

As a result, in the case where the targeted video and/or audio data are stored in the HDDs 7A to 7K, the video and/audio data are read out from the HDDs 7A to 7K and decoded through the first to third output processors 11B to 11D, and the obtained video/audio data is supplied to the switcher 41, similarly to the aforementioned reproduction operation.

Further, the controller 40 switching-controls the switcher 41 based on the supplied command and transmits the targeted video data D20 out of all input video and/or audio data to the mixer 53.

At this time, the controller 22 transmits the bit map data D12 previously given through the Ethernet 50 or the memory card 51, to the mixer 53 through the card slot 52 based on the supplied command.

The mixer 53 superimposes the bit map data D12 upon the supplied video data D20 and transmits the obtained video data D21 to the switcher 41.

Then, the video data D21, under the control of the controller 40, is output from the corresponding input/output terminal 6A of the connector box 6 to the external through the switcher 41, the selector 37–39 of the corresponding first–third output processor 11B–11D in order, together with the corresponding audio data, or is given to the selector 23 of the input processor 11A through the switcher 41 and then is stored in the HDs of the HDDs 7A to 7K similarly to aforementioned recording operation.

In this way, the video server 1 superimposes the bit map data D12 upon the video data D20 out of the video and/or audio data included in the input data D1 or the video and/or audio data stored in the HDDs 7A to 7K, and outputs this to the external or stores this in the HDDs 7A to 7K.

Further, the video server 1 supplies new program data for any one of controllers 20, 21, 22, 26, 30, 40 through the Ethernet 50 or the memory card 51 to the controller 22, so as to rewrite firmware (previously stored program data) stored in the targeted controller 20, 21, 22, 26, 30, 40 under the control of the controller 22.

The controller 20, receiving the rewriting command of programs written in any one of the controllers 20, 21, 22, 26, 30, 40 by manipulating the control panel 4, transmits the corresponding command to the controller 22 and the targeted controller 20, 21, 26, 30, 40 through the bus 10.

At this time, the controller 22 sequentially takes in and stores the program data D13 which is given through the Ethernet 50 or is stored in the memory card 51 inserted in the card slot 52. Note that, the controller 22 stores the program data in the internal ROM in the case of the data D13 is for itself.

Further, the targeted controller 20, 21, 26, 30, 40 transmits a request command to transfer the program data D13 to the controller 22 based on the supplied command. Further, the controller 20, 21, 26, 30, 40 records the program data D13 which is given from the controller 22 as this result in the ROM for storing firmware of the controller 20, 21, 26, 30, 40. Note that, the video server 1 uses the rewritable flash ROM as the ROM for storing firmware of the controller 20, 21, 22, 26, 30, 40 in order to perform such processing.

In this way, the video server 1 is easily able to perform the version-up of firmware of each controller 20 21, 22, 26, 30, 40 through the Ethernet 50 or the memory card 51.

Note that, in the video server 1, in the controllers 20, 21, 22, 26, 30, 40 when the power is turned on, the programs recorded in the ROM is transmitted to the memory device such as the random access memory (RAM) once and then, various processing based on the program is executed, thereby making it possible to previously avoid the error operation in the program rewriting.

Further, the video server 1 gives new various setting data for any one of the controllers 20, 21, 22, 26, 30, 40 through the Ethernet 50 or the memory card 51 to the controller 22, and thereby making it possible to change the various settings of the targeted controller 20, 21, 22, 26, 30, 40 under the control of the controller 22.

Here, the setting data is data which is previously given for driving the aforementioned processors. For example, the data is to set any one of plural input/output processors to the input processor 11A or another first to third output processor 11B–11D as shown in FIG. 2, to show the total number of input/output processors, to be used as the transfer rate of data to be input/output, or the like.

The controller 20, receiving the setting change request of any one of the controllers 20, 21, 22, 26, 30, 40 by manipulating the control panel 4, transmits the corresponding command to the controller 22 and the targeted controller 20, 21, 22, 26, 30, 40 through the bus 10.

At this time, the controller 22 sequentially takes and stores therein the setting data D14 which is given through the Ethernet 50 or is recorded in the memory card 51 inserted in the card slot 52.

Further, the targeted controller 20, 21, 22, 26, 30, 40 transmits the request command to transfer the setting data D14, to the controller 22 based on the supplied command. In addition, the controllers 20, 21, 22, 26, 30, 40 stores the setting data D14 given from the controller 22 as this result in the internal RAM.

Then, the controller 20, 21, 22, 26, 30, 40 controls the corresponding circuit based on the setting data D14 stored in the RAM to change the corresponding setting based on the setting data D14.

In this way, the video server 1 can easily change the various settings of each controller 20, 21, 22, 26, 30, 40 through the Ethernet 50 and the memory card 51.

Figure 3:
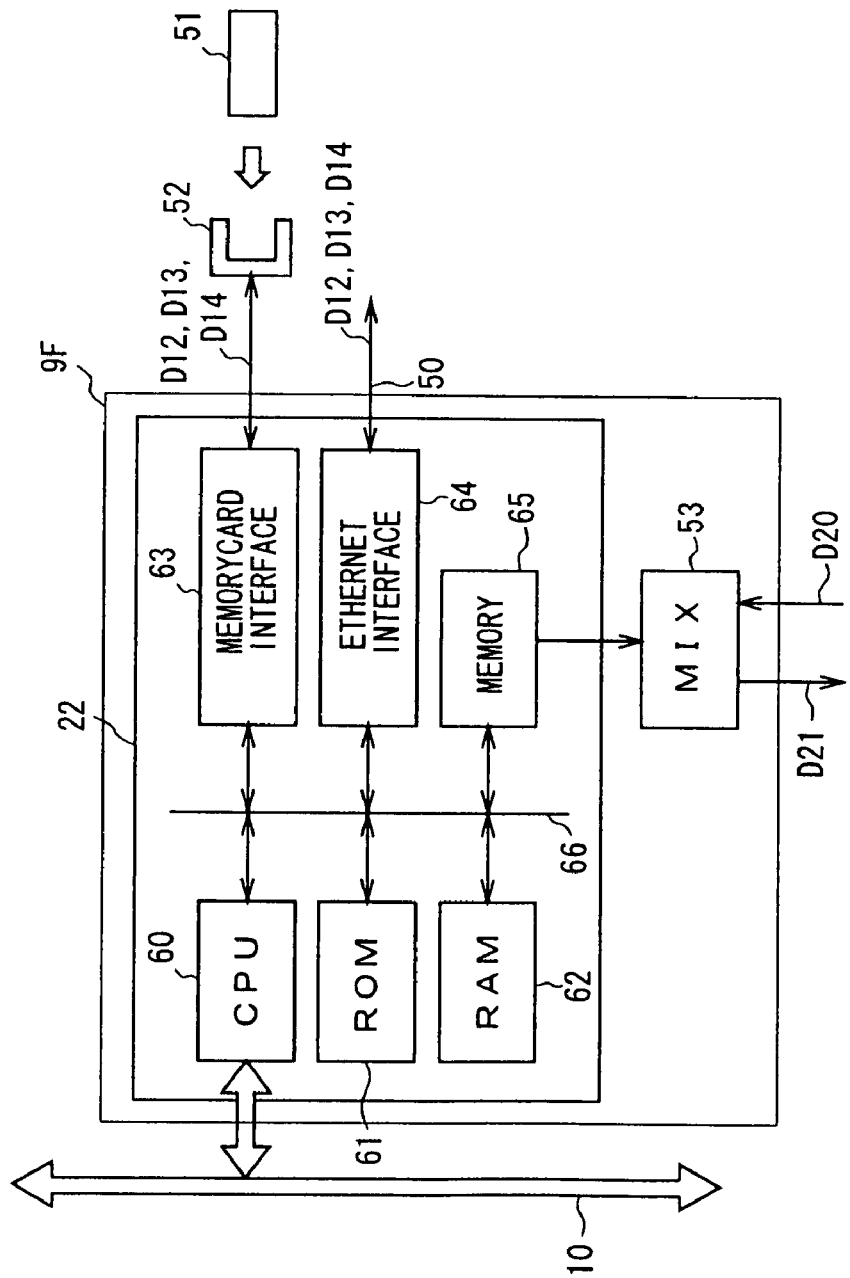
FIG. 3 is a block diagram showing a configuration of a controller for file management.

Here, the controller 22 is constructed by mutually connecting a central processing unit (CPU) 60, the ROM 61 storing firmware, a RAM 62 as a work memory of the CPU 60, a memory card interface circuit 63 as a format changing means, an Ethernet interface circuit 64 and a memory 65 through a local bus 66, as shown in FIG. 3.

The CPU 60, based on a command supplied from the controller 20, accesses the card slot 52 through the memory interface circuit 63 to read out data (bit map data D12, program data D13 and setting data D14) recorded in the memory card 51 inserted in the card slot 52 or to take in various data supplied through the Ethernet 50 from the external through the Ethernet interface circuit 64, and stores this in the ROM 61 (only the case where the data is the program data D13 for the controller 22) or in the RAM 62 through the local bus 66.

Then, for example, in the case where the taken data is the bit map data D12, the CPU 60 stores this in the memory 65 through the local bus 66, and then, in the case of performing superimposing processing on the bit map data D12, reads out the data D12 from the memory 65 and supplies this to the mixer 53.

Further, in the case where the data taken in the RAM 62 is the program data D13 or the setting data D14, the CPU 60 reads out this from the RAM 62 in accordance with the transferring request command from the corresponding controller 20, 21, 26, 30, 40 as described above, and transmits this to the corresponding controller 20, 21, 26, 30, 40 through the bus 10.

In this way, the controller 22 takes in the various data such as the bit map data D12, the program data D13 and the setting data D14 from the external and transfers this to another substrate 9 (9B, 9D–9I) as required, in addition to the file management processing. Note that, the memory 65 stores the aforementioned file system, and the recording or reproducing control is performed based on the stored information as required.

(2) Operation and Effect of the Embodiment

In the above configuration, the video server 1 takes in the bit map data D12 supplied through the Ethernet 50 or the memory card 51 into the controller 22 to store and hold them.

If required, the targeted video data D20 among the video and/or audio data supplied from the external or read out from the HDDs 7A to 7K is given to the mixer 53 via the switcher 41, and is superimposed upon the aforementioned bit map data D12 in the mixer 53.

Then the obtained video data D21 is output through the corresponding output processor 11B–11D together with the audio data attached thereto through the switcher 41, or compression–encoded through the input processor 11A and supplied to the HDDs 7A to 7K to be recorded in the HDs.

Further, the video server 1 takes the program data D13 and the setting data D14 supplied through the Ethernet 50 or the memory card 51 in the controller 22 to store and hold them.

Then, under the control of the controller 20, when the transfer request command of the program data D13 or the setting data D14 is given from the targeted controller 20, 21, 26, 30, 40, the controller 22 transfers the program data D13 or the setting data D14 to the corresponding controller 20, 21, 26, 30, 40 in response to this command.

Then, the controller 20, 21, 26, 30, 40 updates firmware to new programs by storing the transferred program data D13 in the ROM for storing firmware, or changes settings by controlling the corresponding circuit based on the setting data D14.

Therefore, the video server 1 can perform signal processing of superimposing the bit map data D12 upon the video/audio data which is supplied from the external or stored therein, without requiring the external devices as described above, which can realize the high functional ability.

Further, the video server 1 can perform the update of firmware stored in the controllers 20, 21, 22, 26, 30, 40 only by supplying the program data D13 through the Ethernet 50 or the memory card 51, so that, for example, the version-up of software can easily be performed as compared with the conventional case of exchanging ROMs and moreover, accidents which occurs in ROM–exchanging can be prevented in advance.

Further, the video server 1 can change various settings of each substrate 9(9A to 9I) only by supplying the setting data D14 through the Ethernet 50 or the memory card 51, so that desired settings can be surely and easily performed with preventing the setting error. In addition, it is possible to easily set plural video servers 1 to the same setting.

(3) Other Embodiments

Note that, in the aforementioned embodiment, the present invention applies a hard disk as a recording medium of the video server 1 composed as shown in FIG. 1. However, the present invention is not limited thereto and DVD, MO or the like can be used and moreover, a semiconductor memory such as a D-RAM and a flash memory can be used.

Further, in the aforementioned embodiment, a flash ROM can be applied as a storing means for storing programs in the controllers 20, 21, 22, 26, 30, 40 of the substrates 9(9B, 9D to 9I). However, the present invention is not limited thereto and a device other than a memory device can be applied.

As described above, according to the present invention, a data recorder-reproducer which records and reproduces input video data in a disc recording medium which can be accessed at random and a bit map data processing method of the data recorder-reproducer comprise a taking-in means for taking in bit map data supplied from the external, and a superimposing processing means for superimposing the bit map data upon data output from the recording medium or upon data input in an input/output means. Therefore, the device itself can superimpose bit map data upon video data without requiring other external devices, which can realize the data recorder-reproducer and the bit map data processing method of the data recorder-reproducer which are capable of significantly improving the functional ability.

Further, according to the present invention, in the data recorder-reproducer which records and reproduces input video data in a disc recording medium which can be accessed at random and the control program data processing method of the data recorder–reproducer, first control program data stored in a rewritable storing means is rewritten to second control program data supplied from the external. Therefore, the update of control program can be performed easily and thus, the data recorder–reproducer which can easily perform the version-up of software and the control program data processing method of the data recorder-reproducer can be realized.

Furthermore, according to the present invention, in the data recorder-reproducer which records and reproduces input video data in a disc recording medium which can be accessed at random and a setting data processing method of the data recorder-reproducer, setting data supplied from the external is taken in and the corresponding setting of the input/output processing means is changed based on the setting data, so that various settings can be easily changed. Thus, the data recorder-reproducer which can significantly improve its usability and the setting data processing method of the data recorder-reproducer can be realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A video server for internally superimposing bit map data on audio-visual data, comprising:
    a plurality of recording media in a RAID (Redundant Array of Inexpensive Discs) configuration including interpolation means for restoring lost audio-visual data by using stored parity data and remaining audio-visual data:
    interface means for receiving bit map data, a control program, and setting data externally supplied from a network or a memory card;
    integral mixing means for internally superimposing said bit map data on said audio-visual data within said video server;
    rewritable storage means for storing said control program received by said interface means for controlling said video server; and
    setting changing means for changing settings of said video server based on said setting data received by said interface means.

2. A method for internally superimposing bit map data on audio-visual data for use in a video server with a plurality of recording media in a RAID-configuration, the method comprising:
    interpolating lost audio-visual data by using stored parity data and remaining audio-visual data;
    receiving bit map data, a control program, and setting data externally supplied from a network or a memory card through an interface;
    superimposing said bit map data on audio-visual data within said video server using an integral mixer;
    rewriting said control program received in said receiving step into a rewritable storage medium; and
    changing settings of said video server based on said setting data received in said receiving step.

* * * * *